Nov. 20, 1945.  C. D. GROVE  2,389,308
CONVERTIBLE WHEEL ENDLESS DRIVE MECHANISM
Filed April 19, 1943  4 Sheets-Sheet 1
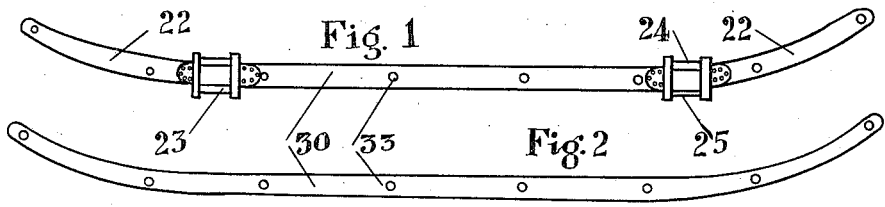
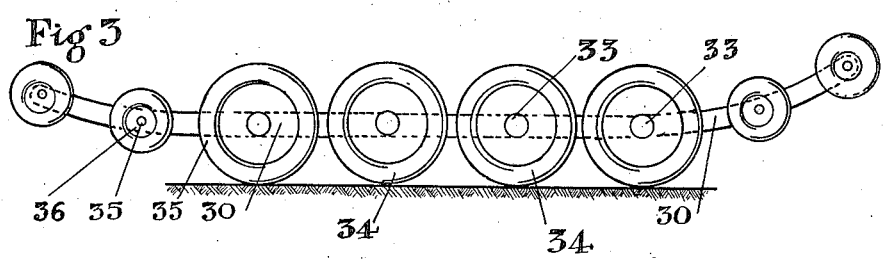
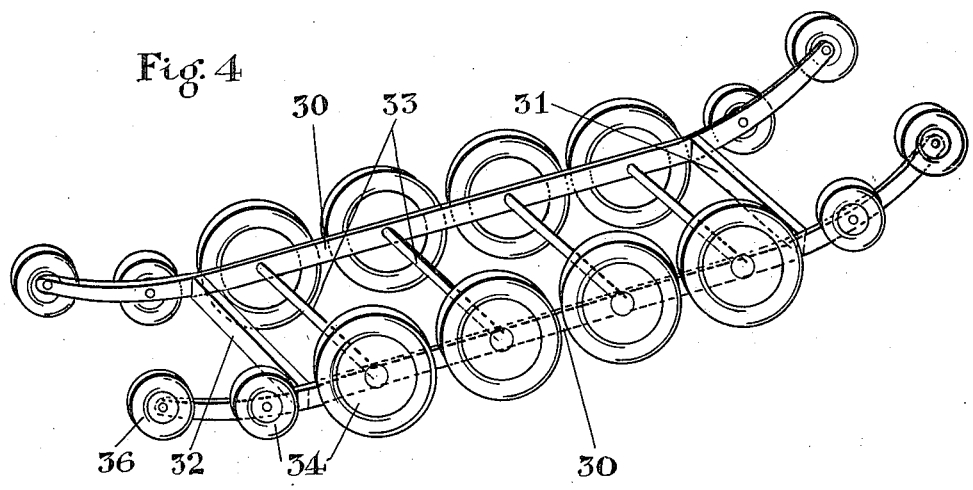
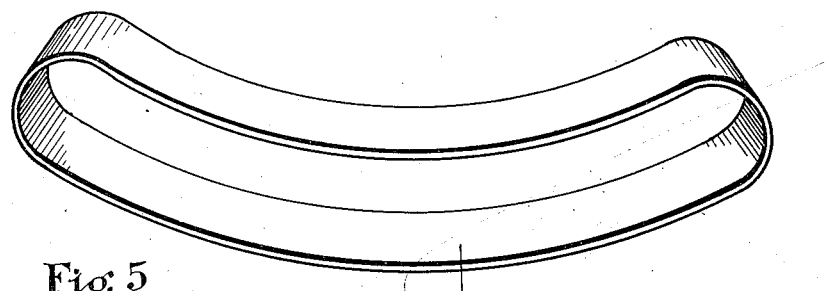
INVENTOR
C. D. Grove
ATTORNEY

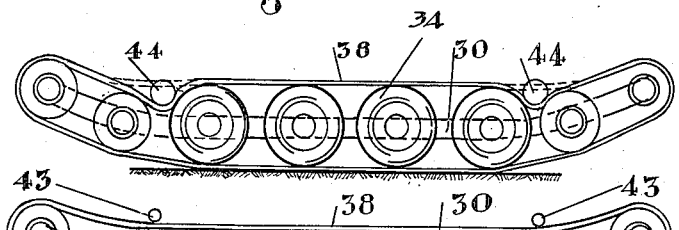
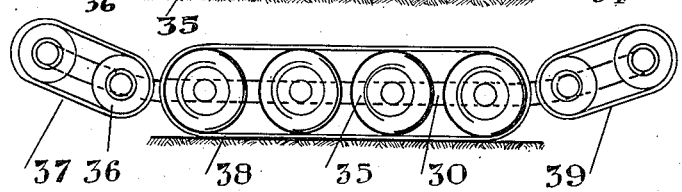
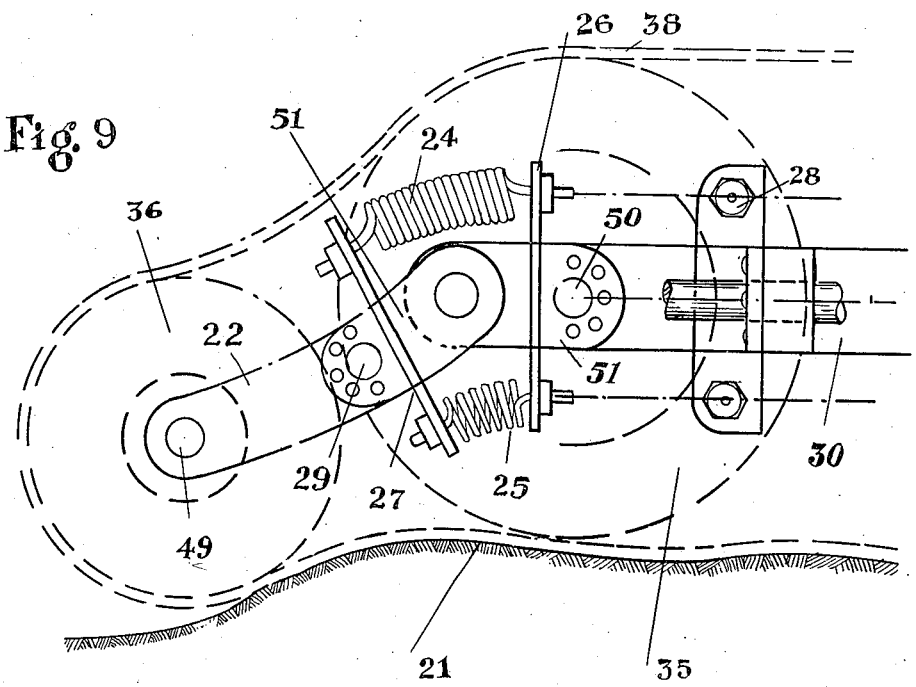

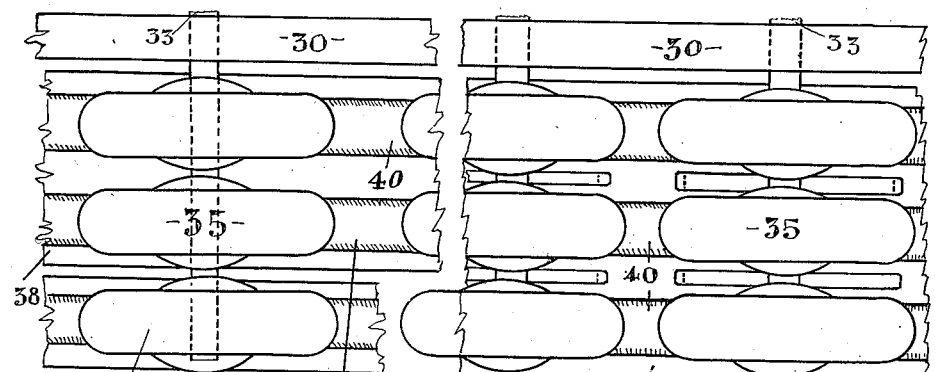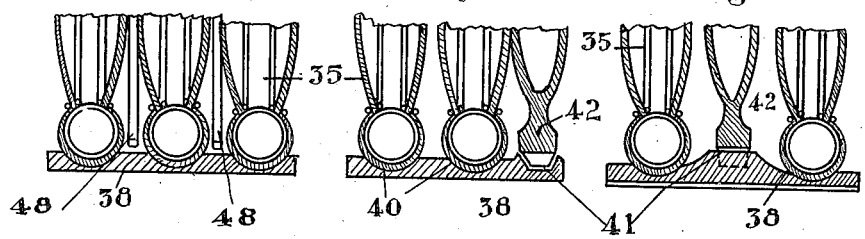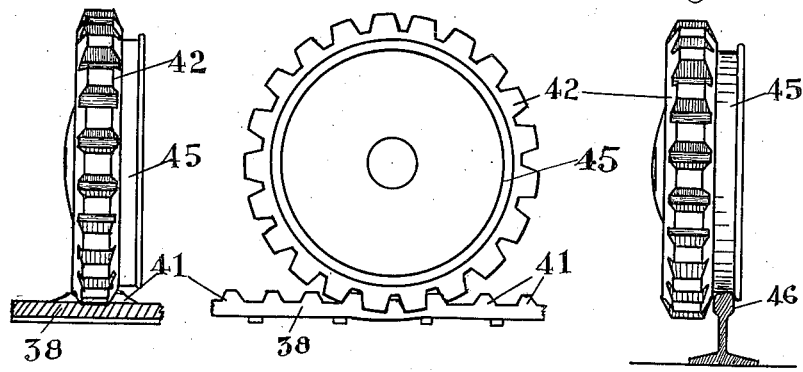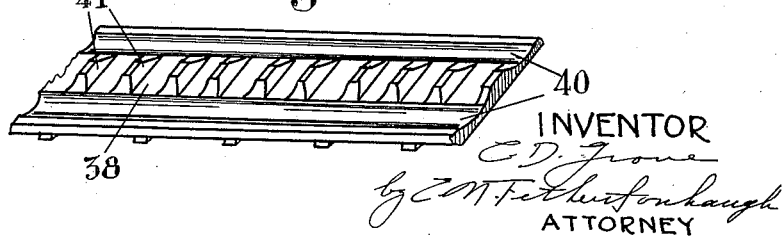

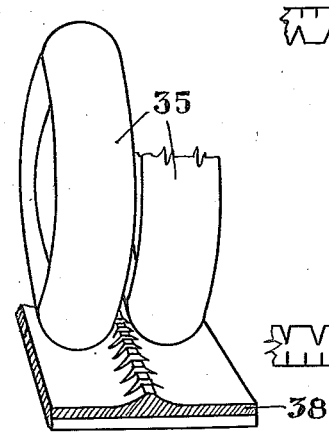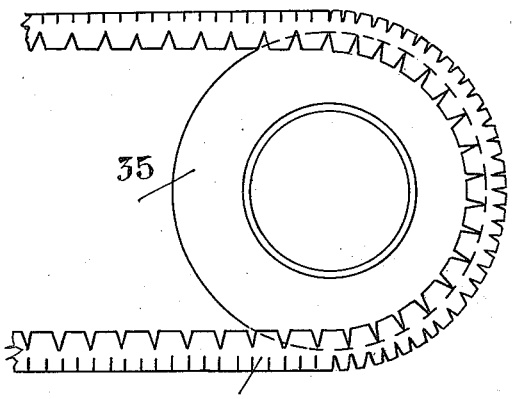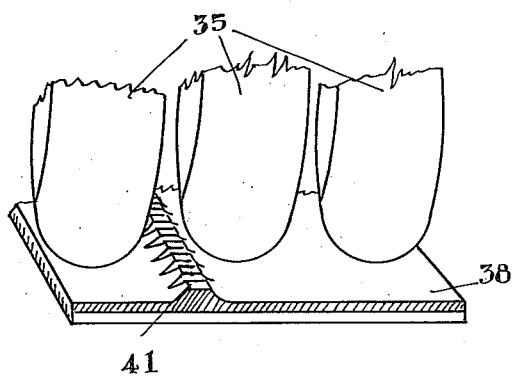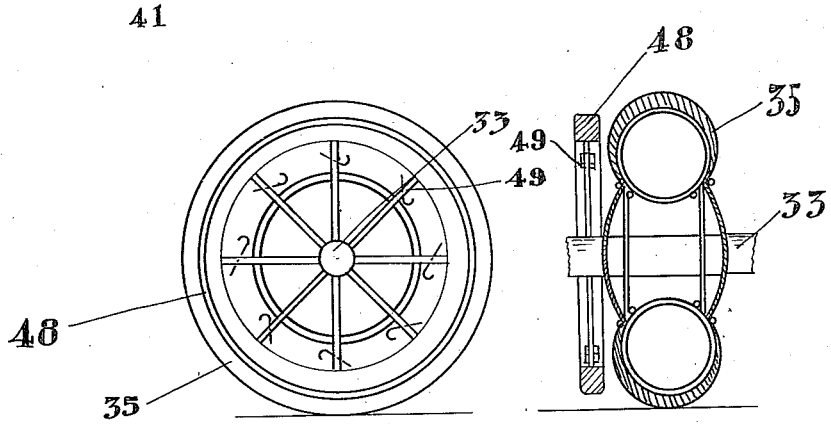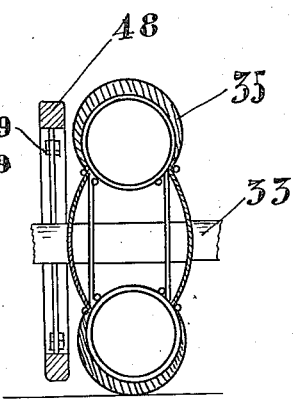

Patented Nov. 20, 1945

2,389,308

UNITED STATES PATENT OFFICE 2,389,308

CONVERTIBLE WHEEL ENDLESS DRIVE MECHANISM

Collins Denny Grove, Joliette, Quebec, Canada

Application April 19, 1943, Serial No. 483,707

1 Claim. (Cl. 305—9)

The invention is relative to improvements in convertible wheel endless drive mechanisms as described in the present specification and illustrated in the accompanying drawings that form a part of the same.

The invention consists essentially of the novel features of construction as pointed out broadly and specifically in the claim for novelty following a description containing an explanation in detail of acceptable forms of the invention.

The objects of the invention are to devise a means for providing land conveyances with endless traction drive mechanisms and thereby materially increase the utility of the conveyances by enabling them to travel over swampy land and cross country; to furnish a quick and efficient method of attaching the endless belt to the running gear of the conveyance; and generally to provide a convertible wheel mechanism that may be used on all types of conveyances and which will be economical in cost, durable in construction and efficient for its purpose.

In the drawings—

Figure 1 is a side elevation of an acceptable type of frame for the running gear with adjustable end members.

Figure 2 is a side elevation of an alternative type of frame with single side members.

Figure 3 is a side elevation of Figure 2 with the accompanying running gear.

Figure 4 is a perspective view of Figure 3.

Figure 5 is a perspective view showing an acceptable type of endless belt.

Figure 6 is a side view of the frame and accompanying gear having an endless belt and provided with tightening rollers.

Figure 7 is a side view of the frame and accompanying running gear showing an endless belt with optional roller guides.

Figure 8 is a side view of the frame and accompanying running gear having separate endless belts.

Figure 9 is a fragmentary enlarged side elevation of one end of a frame for the running gear having a member and a spring control.

Figure 10 is a fragmentary plan view of the frame and running gear disclosing an interchangeable belt and an optional detachable wheel.

Figure 11 is a fragmentary plan view of a frame and accompanying running gear and inter-changeable conveyor belt.

Figure 12 is a fragmentary cross sectional view showing a tractor wheel mechanism and a grooved type of endless belt, and auxiliary emergency wheel disks.

Figure 13 is a fragmentary cross sectional view showing a modified form of running gear and accompanying belt.

Figure 14 is a fragmentary cross sectional view of a running gear having a centre sprocket wheel and accompanying belt.

Figure 15 is an end view of a sprocket wheel in engagement with the belt and a flanged wheel forming a part thereof.

Figure 16 is a side view of the sprocket wheel in engagement with the belt, and having a flanged wheel.

Figure 17 is an end view of the sprocket wheel and flanged wheel with the endless belt removed and showing the flanged wheel in engagement with a railway track.

Figure 18 is a fragmentary perspective view of a longitudinal grooved endless belt.

Figure 19 is a perspective view of a double wheel in engagement with endless belt.

Figure 20 is a fragmentary side view of a pneumatic wheel in engagement with a rubber composition type of endless belt.

Figure 21 is a fragmentary perspective view of a triple running gear in contact with the belt.

Figure 22 is a side elevation of a running wheel provided with an auxiliary disk, and provided with water propelling means.

Figure 23 is an end sectional view of a running wheel provided with an auxiliary disk.

Like numerals of reference indicate corresponding parts in the various figures.

The purpose of this invention is to convert the running gear of a conveyance such as an armored car into an endless drive mechanism and consequently enabling the same to travel over rough country, as well as across swamps and otherwise impassable lands and where it would be impossible for the ordinary running gear to procure the necessary traction for moving the conveyances. It is also the purpose of this invention to enable the occupants of the car to quickly detach or attach the endless drive mechanism to the running gear.

Another purpose of this invention is to construct a frame and accompanying running gear in such a way that the weight, as applied to the conveyance, will be more equally distributed throughout the frame and running gear.

A further purpose of this invention is to enable certain types of railway cars to be used as trackless conveyances by utilizing the endless drive mechanism. The accompanying drawings illustrate acceptable types of running gear and endless drive mechanism for the above mentioned purpose, but it is of course understood that modifications, as well as additions, may be made without departing from the essential features of this invention as hereinafter more particularly described.

Referring to the drawings: the types of frame as illustrated for use on land conveyances consists of cross members 31 and 32, central side members 30, with adjustable members 22. The side members 30 are provided with orifices for the introduction of the wheel axles 33 and the wheels 34 are simply secured to the ends of the axles.

A simplified acceptable type of frame (Figure 2) consists of rigid type of frame having the side members 30 with orifices therethrough for the introduction of the shafts or wheel axles 33 and to which is secured the running gear.

The adjustable end members 22, as illustrated in Figures 1 and 9, consists of separate extension members 22 of the side members 30 and form journal members for the shafts 49 and 50 carrying wheels of different diameters 35 and 36 which engage with the endless belt 38. These extension members are a series of link rods 51 pivoted to one another and to the side members 30 and are provided with the spring brackets 27 and 26 to which are attached the tension and compression springs 24 and 25. In this way the extension unit is free to follow the contour of the uneven ground and yet held in check by the spring mechanism, and act as a guide for the rest of the endless drive mechanism.

The running gear may be arranged either in individual, double, triple or more wheels and in alignment with one another, in accordance with the structure that is being carried thereby, and these wheels may be either of the solid type or of the pneumatic type. The endless belt may envelope the wheels as a single unit (Figure 7) or as a plurality of units 37, 38, 39 (Figure 8).

The endless belt is formed of a rubber composition or other equivalent material and is provided with a longitudinal groove 40, and may or may not have cleats 41, for engagement with the sprocket wheels 42, which may be included in the running gear.

In the actual application of the belt to the running gear, idlers 43 (Figure 7) may be used as well as tightening members 44 as shown in Figure 6.

It will be seen from the aforegoing that since the running gear is in the form of pneumatic wheels and the endless belt is made of rubber or kindred material, that good traction is provided, which eliminates the necessity of having constructional mechanism that would ordinarily be used in the regular type of endless drive mechanisms that are used on tractors and other devices, and thereby eliminating excessive weight and reducing the number of parts to the minimum. In utilizing the invention for railway cars, the railway car may simply be provided with a flanged wheel 45, which is adapted to engage with the rails 46 of the track, when required.

In certain cases it may be necessary to increase the width of the running gear and accordingly an auxiliary wheel 46a may simply be applied to the axial 33 and suitably secured thereto. Naturally if it is desired to use an additional endless belt, there will be added an auxiliary wheel to each set of wheels already in use and the extra endless belt 47 is then applied around the auxiliary wheels and in that way additional traction is added to the conveyance.

Inasmuch as the preferable type of wheels used will be pneumatic tires in order to procure better traction with the rubber or other composite endless belt, it may be advisable to provide a plurality of disk wheels 48 made of hard fiber or other similar material and these disk wheels are secured to the axles 33 and so arranged that their outer circumference will terminate short of the outer circumference of the tire; consequently, if the tire should be unexpectedly deflated the fiber disk will take up the load and thereby enable the operator to drive his conveyance to the nearest repairing station or other location without any danger of ruining the tire which has been deflated.

The use of this auxiliary emergency wheel disk is equally adaptable for co-operation with the endless belt mechanism or independent of the endless belt mechanism.

What I claim is:

A convertible wheel endless belt mechanism comprising a frame formed of side members, cross members joining said side members together, extension members having a plurality of link rods connected to one another and to said side members, spring brackets secured to said link rods, tension and compression springs secured to said spring brackets, a plurality of shafts journalled in said side members and in said link rods and extending therebeyond, vehicle wheels of the same diameter secured to the shafts of said side members, vehicle wheels of another diameter secured to the shafts of said link rods, and an endless belt adapted to engage with the vehicle wheels of said side members and said extension members.

COLLINS DENNY GROVE.